United States Patent
Wang

(10) Patent No.: US 7,029,191 B2
(45) Date of Patent: Apr. 18, 2006

(54) APPARATUS FOR INPUTTING SPECIAL CHARACTER AND METHOD FOR THE SAME

(75) Inventor: Chin Ping Wang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/934,479

(22) Filed: Sep. 7, 2004

(65) Prior Publication Data

US 2005/0025552 A1 Feb. 3, 2005

Related U.S. Application Data

(63) Continuation-in-part of application No. 10/132,187, filed on Apr. 26, 2002, now abandoned.

(51) Int. Cl.
*B41J 5/10* (2006.01)

(52) U.S. Cl. ............................. 400/486; 400/98; 341/22
(58) Field of Classification Search ................. 341/22; 400/486, 489, 98; 715/536
See application file for complete search history.

(56) References Cited

U.S. PATENT DOCUMENTS

| | | | | |
|---|---|---|---|---|
| 4,980,840 | A * | 12/1990 | Yin et al. | 715/538 |
| 5,719,841 | A * | 2/1998 | Kitayama | 369/47.21 |
| 6,198,474 | B1 * | 3/2001 | Roylance | 345/168 |
| 6,574,517 | B1 * | 6/2003 | Park et al. | 700/84 |
| 6,939,067 | B1 * | 9/2005 | McLoone et al. | 400/489 |
| 6,965,372 | B1 * | 11/2005 | Woods | 345/168 |
| 6,979,140 | B1 * | 12/2005 | McLoone et al. | 400/486 |
| 2002/0107866 | A1 * | 8/2002 | Cousins et al. | 707/102 |
| 2004/0025033 | A1 * | 2/2004 | Todd | 713/189 |
| 2005/0102432 | A1 * | 5/2005 | Winslow | 710/1 |
| 2005/0207817 | A1 * | 9/2005 | Jenkins | 400/489 |

* cited by examiner

*Primary Examiner*—Andrew H. Hirshfeld
*Assistant Examiner*—Dave A. Ghatt
(74) *Attorney, Agent, or Firm*—Rosenberg, Klein & Lee

(57) ABSTRACT

An apparatus for inputting special character and a method for the same are proposed. The keyboard using the inventive apparatus and method has hot keys assigned with ASCII codes corresponding to special characters to be input. By holding an ALT key and then pressing the hot key, the scan code corresponding to the ASCII codes is sent to input the special character. The inventive apparatus and method can be applicable to various operation systems.

8 Claims, 3 Drawing Sheets

APPARATUS FOR INPUTTING SPECIAL CHARACTER AND METHOD FOR THE SAME

CROSS REFERENCE TO RELATED APPLICATION

This application is a continuation-in-part of U.S. application Ser. No. 10/132,187, filed on 26 Apr. 2002 now abandoned and entitled "apparatus for inputting special character and method for the same".

FIELD OF THE INVENTION

The present invention relates to an apparatus for inputting special character and a method for the same, especially to an apparatus for inputting special character not available on conventional keyboard with the help of ALT key and a method for the same.

BACKGROUND OF THE INVENTION

The conventional ways for inputting special character by keyboard are realized by either directly inputting through keyboard, or inputting with the help of software. In the first way, the ALT key is held and the decimal ASCII codes corresponding to the special character are input through keypad, then releasing the ALT key to input the special character. For example, holding the ALT key and inputting the decimal ASCII codes 0225 and then releasing the ALT key, the special character β is input. In the second software-based way, the special character can be input by clicking the symbol table provided by specific application such as Microsoft Word.

However, in above-mentioned first way, a plurality of keystrokes is required and the user should memorize the decimal ASCII codes corresponding to the special character for inputting the special character. In the second way, the symbol table is supported by specific application and cannot be used for other applications. It is inconvenient for both approaches.

SUMMARY OF THE INVENTION

It is an object of the present invention to provide an apparatus for inputting special character and a method for the same. By the present invention, the character not available on conventional keyboards can be easily input with the help of ALT key and the inventive apparatus and method are applicable to various operation systems.

It is another object of the present invention to provide an apparatus for inputting special character and a method for the same, wherein the user does not need to memorize the ASCII code associated with the special character to be input.

To achieve above objects, the present invention provides a method for inputting a special character through a keyboard. Therein, the keyboard has at least one hot key assigned with an ASCII code associated with the special character. The method includes actuating an ALT key and pressing the hot key to generate a scan code corresponding to the ASCII code. The scan code is sent after the ALT key is released.

To achieve above objects, the present invention provides a keyboard with a special character inputting function. It includes at least one special character key. Actuation of an ALT key and simultaneous actuation of the special character key generate a scan code associated with the special character key.

The various objects and advantages of the present invention will be more readily understood from the following detailed description when read in conjunction with the appended drawing, in which:

DETAILED DESCRIPTION OF THE INVENTION

Figure 1:
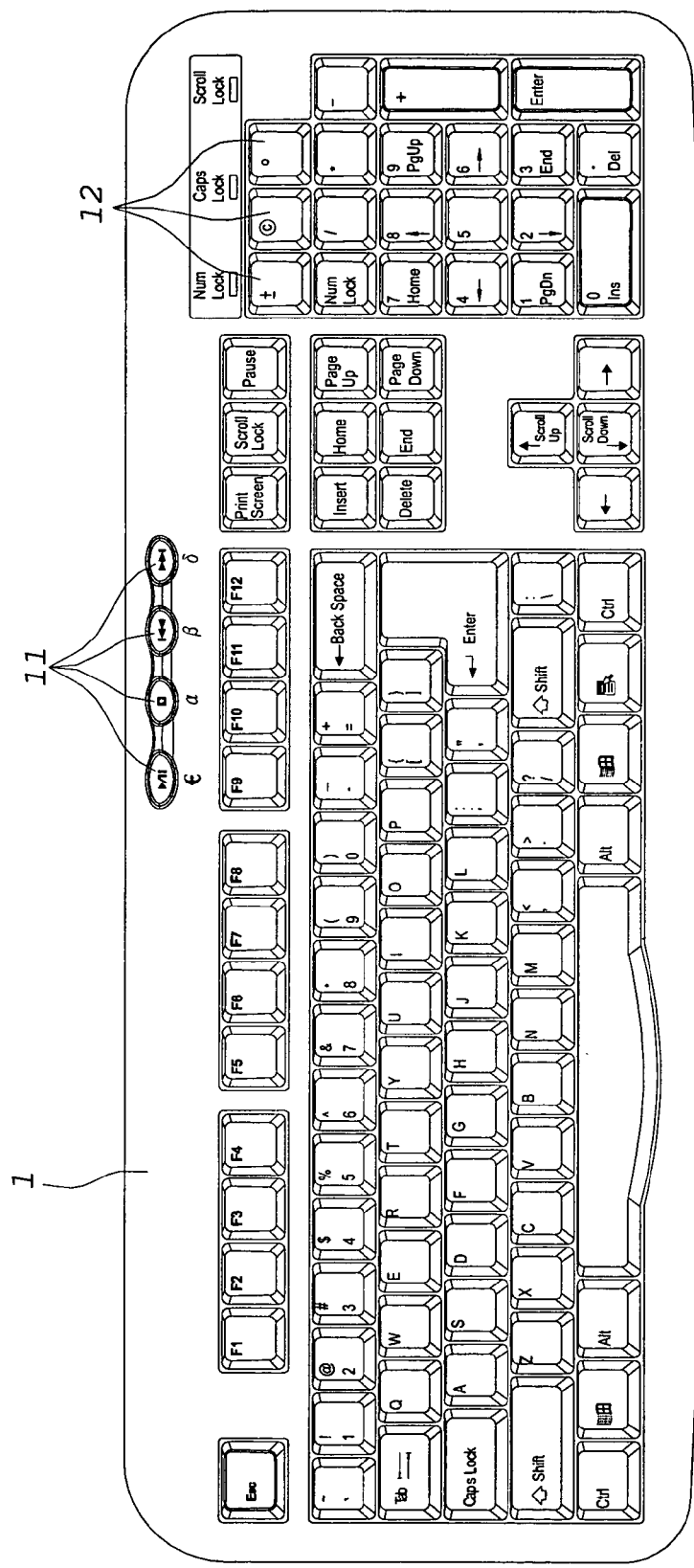
FIG. 1 shows a top view of a keyboard using the apparatus for inputting special character according to the present invention.

FIG. 1 shows a top view of a keyboard 1 using the apparatus for inputting special character according to the present invention. The present invention uses ALT key in conjunction with extra keys for inputting special characters not available on conventional keyboard such as β, ±, μ, ✗, °, ⊕, €, etc. Moreover, the present invention is applicable to various operation systems. In the present invention, the extra key is referred to hot key 11 provided on the keyboard or special character key 12 augmented by the present invention.

In practice, the hot key 11 can be any key that is not defined in IBM standard keyboard, such as a key for playing audio or video files, volume up, volume down, MS Word actuation, MS Excel actuation, etc.

Moreover, scan codes corresponding to the decimal ASCII codes of the special characters to be inputted are assigned to the extra keys. Therefore, the hot key 11 is assigned with a conventional extended keycode for hot key function defined by the computer system and also assigned with a scan code corresponding to the ASCII codes when being used with the ALT key. The augmented special character key 12 is also used with the ALT key for inputting special characters. Moreover, marks associated with the characters are printed on the hot key 11 and the special character key 12 or on the proximity thereof. The method for inputting special character according to the present invention is described below.

Figure 2:
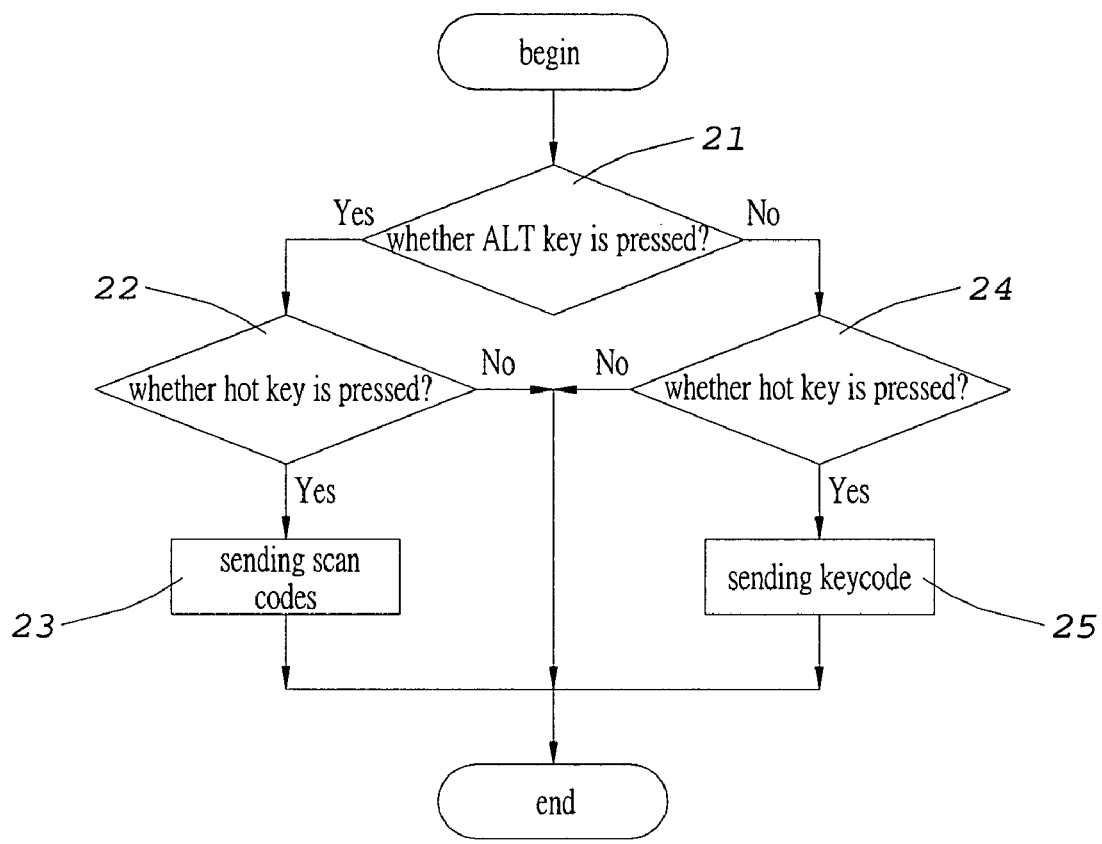
FIG. 2 shows the flowchart of the method according to the first preferred embodiment of the present invention.

FIG. 2 shows the flowchart of the method according to the first preferred embodiment of the present invention and the method has following steps:

step 21: examining whether an ALT key is pressed? If true, going to step 22, else going to step 24;

step 22: examining whether a hot key is pressed? If true, going to step 23, else ending the process;

step 23: sending a scan code corresponding to the ASCII codes associated with the hot key and then ending the process;

step 24: examining whether a hot key is pressed? If true, going to step 25, else ending the process;

step 25: sending a keycode for the hot key and then ending the process.

In the step 23, the ALT key is held and then the hot key is pressed to send the scan codes corresponding to the hot key. The computer system receives the scan codes and then displays the associated character. In the step 25, the ALT key is not held and the original keycode for the hot key is sent when the hot key is pressed.

Figure 3:
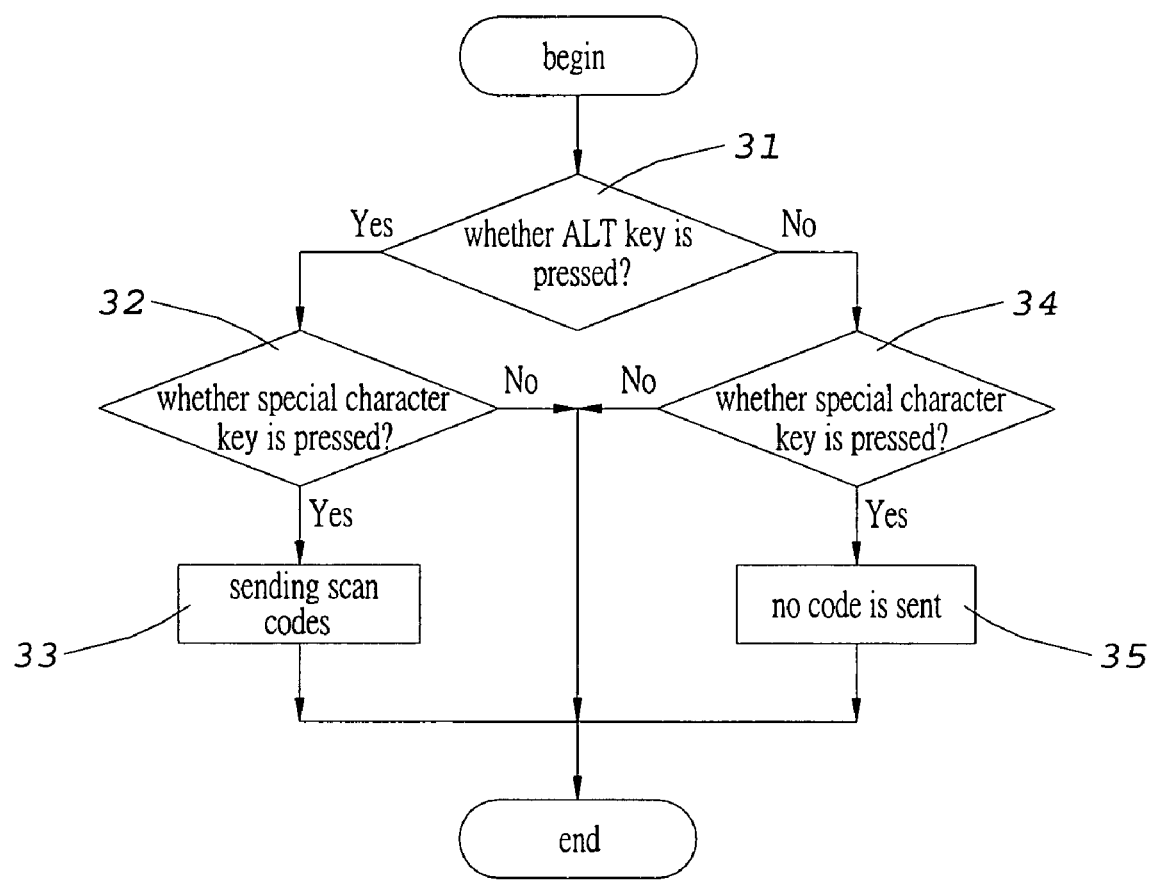
FIG. 3 shows the flowchart of the method according to the second preferred embodiment of the present invention.

FIG. 3 shows the flowchart of the method according to the second preferred embodiment of the present invention. In the first preferred embodiment of the present invention, the character is input by ALT key with the hot key 11. In the second preferred embodiment of the present invention, the character is input by ALT key with the special character key 12. The method according to the second preferred embodiment of the present invention has following steps:

step 31: examining whether an ALT key is pressed? If true, going to step 32, else going to step 34;

step 32: examining whether a special character key is pressed? If true, going to step 33, else ending the process;

step 33: sending a scan code corresponding to the ASCII codes associated with the special character key and then ending the process;

step 34: examining whether special character key is pressed? If true, going to step 35, else ending the process;

step 35: no code is sent then ending the process.

In the step 33, the ALT key is held and then the character key is pressed to send the scan codes corresponding to the special character key. The computer system receives the scan codes and then displays the associated character. When the special character key 12 is pressed alone, no code is sent except that certain codes are assigned to the special character key 12.

To sum up, the apparatus for inputting special character and a method for the same have following features:

1. By simplified keystrokes, the special characters not available on conventional keyboard can be input and the inventive method is applicable for all operation systems.

2. The special character can be input by simply pressing ALT plus extra keys (hot key or special character key).

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A method for inputting a special character to a computing device through a keyboard, said special character being one of β, ±, μ, X̶, °, ⊕ and €, the method comprising the following steps:

providing the keyboard with at least one hot key, actuation of which causes an operation specific to at least one application operable on the computing device to be executed without actuating any other key of the keyboard;

assigning the special character to the hot key;

actuating an ALT key; and pressing the hot key to generate a scan code corresponding to an ASCII code, the scan code being provided to the computing device subsequent to the ALT key is being released.

2. The method for inputting a special character through a keyboard as recited in claim 1, wherein a mark associated with the special character is printed on the hot key or proximate thereto.

3. The method for inputting a special character through a keyboard as recited in claim 1, wherein the hot key is assigned a first code being an extended keycode defined by the computing device and a second code being the scan code corresponding to the ASCII code used with the ALT key for inputting the special character.

4. A keyboard with a special character inputting function comprising:

an array of standard keys, said array of standard keys including an ALT key; and at least one special character key, whereby actuation of the ALT key and simultaneous actuation of the special character key generate a scan code associated with the special character key, wherein said special character key is displaced from the array of standard keys on said keyboard and is assigned no other character other than one of the group consisting of β, ±, μ, X̶, °, ⊕ and €.

5. The keyboard with a special character inputting function as recited in claim 4, wherein a mark associated with the special character is printed on the special character key or in the proximity thereof.

6. A method for inputting a special character through a keyboard, the method comprising the steps of:

providing an array of standard keys, said array of standard keys including an ALT key;

providing the keyboard with at least one special character key assigned to no other character than one of the special characters from the group consisting of β, ±, μ, X̶, °, ⊕ and €;

actuating the ALT key; and pressing the special character key to generate a scan code corresponding to an ASCII code, the scan code being provided to the computing device subsequent to the ALT key being released.

7. The method for inputting a special character through a keyboard as recited in claim 6, where said special character key is provided at a location adjacent said array of standard keys.

8. The method for inputting a special character through a keyboard as recited in claim 6, wherein a mark associated with the special character is printed on the special character key or proximate thereto.

* * * * *